United States Patent [19]
Gram

[11] Patent Number: 5,491,306
[45] Date of Patent: Feb. 13, 1996

[54] MASS OSCILLATOR HAVING AN ADJUSTABLE GAS SPRING

[75] Inventor: Martin M. Gram, St. Louis Park, Minn.

[73] Assignee: MTS Systems Corporation, Eden Prairie, Minn.

[21] Appl. No.: 218,127

[22] Filed: Mar. 25, 1994

[51] Int. Cl.⁶ .............................. G01V 1/40; G01V 1/04
[52] U.S. Cl. ............................................. 181/106; 181/119
[58] Field of Search ................................... 367/143, 189; 181/106, 113, 119

[56] References Cited

U.S. PATENT DOCUMENTS

| | | | |
|---|---|---|---|
| 3,909,776 | 9/1975 | Broding et al. | 181/106 |
| 4,396,088 | 8/1983 | Bayhi | 367/143 |
| 4,483,411 | 11/1984 | Mifsud | 181/120 |
| 4,671,379 | 6/1987 | Kennedy et al. | 181/106 |
| 4,834,210 | 5/1989 | Kennedy | 181/106 |
| 4,850,449 | 7/1989 | Cheung | 181/101 |
| 4,993,001 | 2/1991 | Winbow et al. | 367/144 |
| 5,371,330 | 12/1994 | Winbow | 181/106 |

*Primary Examiner*—Ian J. Lobo
*Attorney, Agent, or Firm*—Westman, Champlin & Kelly

[57] ABSTRACT

An apparatus for oscillating a mass at a plurality of selective frequencies includes a source of compressible fluid and a cylinder having a bore filled with the compressible fluid. The cylinder includes a port opening to the bore, the port being connected to the source of compressible fluid. A piston slides in the bore to define a chamber. The piston is operably connected to the fluid mass to oscillate the mass. An average volume of the chamber is adjusted to change the frequency of the oscillating mass.

27 Claims, 10 Drawing Sheets

MASS OSCILLATOR HAVING AN ADJUSTABLE GAS SPRING

BACKGROUND OF THE INVENTION

The present invention relates to apparatuses for oscillating a mass. More particularly, the present invention relates to an apparatus for oscillating a mass against a spring at a natural frequency of the spring-mass system.

Many oscillator systems require that a mass be oscillated at a selected frequency. One such application is related to the exploration of natural resources located below the earth surface. Commonly, exploration includes mapping the subsurface strata in order to ascertain subsurface characteristics. Techniques include using a plurality of acoustical detectors disposed over the surface of the earth or below the surface in existing wells. An acoustical source then generates an acoustical wave. The acoustical detectors receive the reflected and direct acoustical wave from the subsurface strata and that data is used to ascertain the subsurface characteristics.

Although explosives placed in a borehole have been used in the past for generating the acoustical wave, this technique has met with disfavor since the explosive may damage the borehole. Recently, apparatuses have been advanced to establish a resonant standing pressure wave of a desired frequency using the well fluid in the borehole. The standing wave is radiated through the borehole wall into the earth and is eventually received by the acoustical detectors located on the surface or in adjacent boreholes. Although it is generally known that a resonant system yields high energy efficiency because the fluid column is made to oscillate at or near resonance, requiring a relatively small amount of input power to produce a relatively large pressure oscillation, many systems require blocking members to physically isolate the section of the well fluid from the remaining fluid in the borehole. These systems suffer from substantial drawbacks which include the need of moving the blocking members considerable distances down the borehole as well as being able to move the blocking members relative to each other in order to adjust the frequency of the standing pressure wave.

SUMMARY OF THE INVENTION

An apparatus for oscillating a mass at a plurality of selective frequencies includes a source of compressible fluid and a cylinder having a bore filled with the compressible fluid. The cylinder includes a port opening to the bore, the port being connected to the source of compressible fluid. A piston slides in the bore to define a chamber. The piston is operably connected to the mass to oscillate the mass. Reciprocal motion of the piston in the bore defines an average volume of the chamber. The average volume of the chamber is adjusted to change the frequency of the oscillating mass.

As the piston slides in the bore, a pressure in the chamber varies above and below an average pressure. In the preferred embodiment, a tuning circuit is connected between the port and the source of compressible fluid to control flow of the compressible fluid through the port. To decrease the average volume of the chamber and thereby increase the natural frequency of the oscillating mass, the tuning circuit allows the compressible fluid to exit the chamber when the pressure in the chamber is greater than the average pressure. Likewise, to decrease the natural frequency of oscillation, the tuning circuit allows the compressible fluid to flow into the chamber when the pressure in the chamber is less than the average pressure. In one embodiment, a variable stoke actuator is used to allow the average volume of the chamber to be adjusted. In another embodiment, a second cylinder having a slidable piston located in a bore is fluidly connected to the chamber.

The present invention is particularly useful as an apparatus for generating acoustical waves in a borehole. The borehole is filled with a incompressible liquid such as water or drilling mud. The apparatus includes an outer cylindrical casing having a diameter less than the diameter of the borehole so that the liquid surrounds the apparatus to form an annulus of liquid between the casing and the inner wall of the borehole. Generally, the apparatus includes a plurality of port openings located at opposite ends of the apparatus and a third plurality of port openings located between the end port openings. The annulus of fluid is divided into substantially equal cylindrical annuli between the center port openings and each of the end port openings. Operation of the acoustical source causes the fluid in the annuli to oscillate between the center port openings and each of the end port openings. The oscillating movement of the cylindrical annuli fluid masses produces cyclical pressure variations in the fluid surrounding the port openings to generate a corresponding acoustical wave. The end port openings are operably connected to accumulators. The accumulators alternately absorb and release the cyclical flow of the mass annuli to minimize energy loss to the borehole by containing pressure variations to a section of the borehole surrounding the apparatus.

DETAILED DESCRIPTION OF THE PREFERRED EMBODIMENTS

Figure 1:
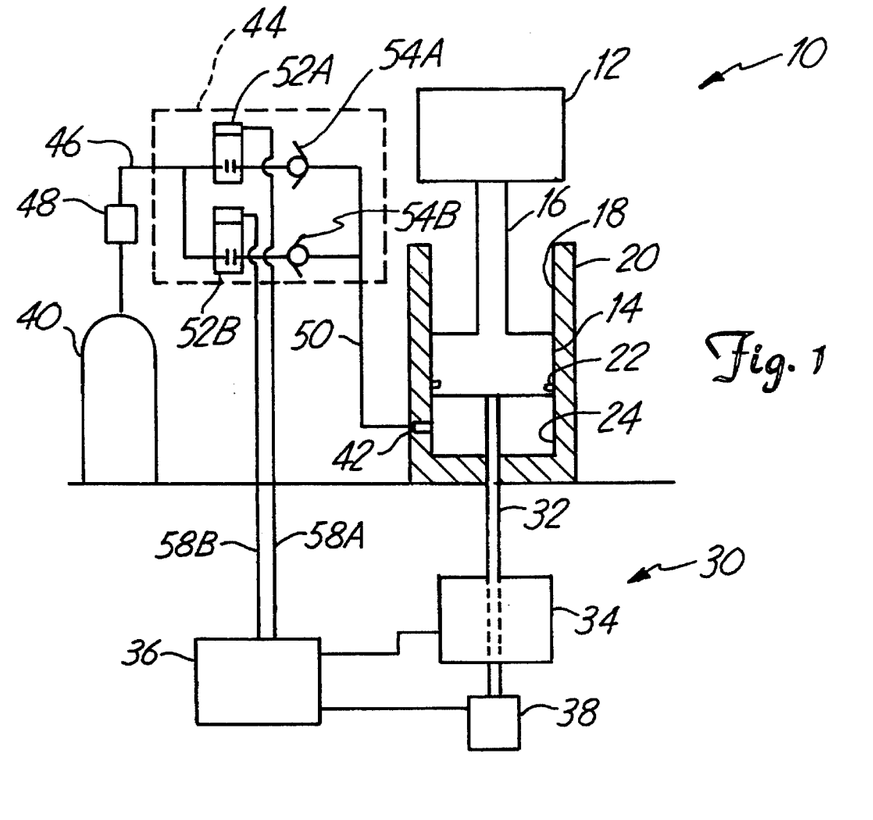
FIG. 1 schematically illustrates a first embodiment of a mass oscillator of the present invention.

FIG. 1 illustrates an apparatus 10 of the present invention which is used to oscillate a mass 12, herein illustrated as a solid mass, at selected natural frequencies in a range of frequencies. The apparatus 10 includes a piston 14 connected to the mass 12 with a connecting rod 16. The piston 14 slides in a bore 18 of a cylinder 20. A suitable seal 22 mounted on the perimeter of the piston 14 forms a seal against the bore 18 to form a chamber 24.

The chamber 24 when filled with a compressible fluid generally a gas functions as a spring. A drive actuator 30 initiates displacement of the mass 12 either upwardly to increase the average volume of chamber 24 or downwardly to compress the piston 14 against a column of compressible fluid in the chamber 24. When released by the actuator 30, the piston 14 returns to its initial position and if periodically excited by the drive actuator in phase with the velocity of the mass to overcome frictional losses, will cause oscillating displacement of the mass 12 at the natural frequency determined by the spring constant of the column of compressible fluid in the chamber 24 and the combined mass of the piston 14, the mass 12 and elements connected thereto.

In the schematic embodiment illustrated, the drive actuator 30 is connected to the piston 14 on a side opposite the mass 12 with a connecting rod 32 that extends through a sealed aperture in the cylinder 20. The drive actuator 30 includes a suitable drive motor 34, for example a linear motor, a hydraulic actuator or other similar device. A controller 36 controls the drive motor 34 and receives an input signal from a position transducer (LVDT) 38 that is operably connected to the connecting rod 32 to sense the position of the piston 14 and mass 12. The controller 36 includes suitable control circuitry to control the drive motor 34 so that the piston 14 and mass 12 are oscillated and maintained at the natural frequency based on positional information from the position transducer 38.

Reciprocal motion of the piston 14 in the chamber 24 defines an average volume of the chamber 24. By varying the average volume of the chamber 24 and thereby the average volume of gas in the chamber 24, the natural frequency of the oscillating mass 12 is also varied. In the embodiment illustrated, the compressible fluid is a suitable gas provided from a source 40 through a port opening 42 in the cylinder 20. Based on control signals provided from the controller 36, a tuning circuit 44 adjusts the amount of gas in the chamber 24. An input line 46 connects the gas source 40 to the tuning circuit 44, if desired through a pressure regulator 48, while an output line 50 connects the tuning circuit 44 to the port 42.

The tuning circuit 44 includes a solenoid valve 52A connected in series with a check valve 54A, the combination of which are connected in parallel with a second solenoid valve 52B and a second check valve 54B. Each of the solenoid valves 52A and 52B are connected to the controller 36 through control lines 58A and 58B, respectively.

Operation of the solenoid valve 52A and 52B allows the average volume of gas within the chamber 24 to be adjusted. As stated above, the piston 14 is supported by a column of gas in the chamber 24. If the piston 14 is stationary, the column of gas is at a pressure determined by the weight of the mass 12 and piston 14. Since the column of gas 24 is alternately compressed and allowed to expand due to oscillating displacement of the piston 14, the pressure of the column of gas in the chamber 24 varies alternately above and below the stationary pressure, hereinafter the average pressure. The pressure of the gas in the input line 46 is adjusted to approximately equal the average pressure.

To decrease the average volume of gas in the chamber 24 and thereby increase the natural frequency of the oscillating piston 14 and mass 12, the solenoid valve 52A is operated to open its corresponding valve, while the corresponding valve to the solenoid valve 52B is held closed. When the piston 14 has compressed the gas in the chamber 24 so that the pressure in the chamber is greater than the pressure in the line 46, a portion of the gas exits the chamber 24 through the port 42. Since the average pressure will be maintained in the chamber 24, the stroke of the actuator 34 will adjust slightly to decrease the average volume in chamber 24. Since the average volume of the chamber 24 has decreased, the spring constant of the column of gas in the chamber 24 has increased thereby changing the natural frequency of the system. The controller 36 controls the drive motor 34 to maintain oscillating displacement of the piston 14 and the mass 12 at the new natural frequency. Likewise, to decrease the frequency of oscillation, the controller 36 operates the solenoid valve 52A to close its corresponding valve and operates the solenoid valve 52B to open its corresponding valve. When the piston 14 has moved sufficiently upwardly so that the pressure in the chamber 24 is less than the pressure in the input line 46, gas enters the chamber 24. Since the average pressure will again be maintained in the chamber 24, the stroke of the actuator 34 will adjust slightly to increase the average volume in chamber 24. Since the average volume of the chamber 24 has increased, the spring constant of the column of gas in the chamber 24 has decreased thereby decreasing the natural frequency of the system. In the embodiment illustrated, no gas is added or lost by adjusting the natural frequency.

The tuning circuit 44 is a passive circuit in that the operation of the solenoid valves 52A and 52B does not have to be timed with pressure changes in the chamber 24. Rather, the check valves 54A and 54B insure proper gas flow through the port 42 when the natural frequency is increased or decreased, respectively. Preferably, the port 42 is small to allow only a small change in the average volume of the chamber 24 for each cycle of the piston 14. In this manner, the tuning circuit 44 sweeps through a range of frequencies limited by minimum and maximum stroke of the drive actuator 30. The sweep rate is determined by flow through the port 42. The solenoid valves 52A and 52B can be turned on and off to decrease the sweep rate.

Figure 2:
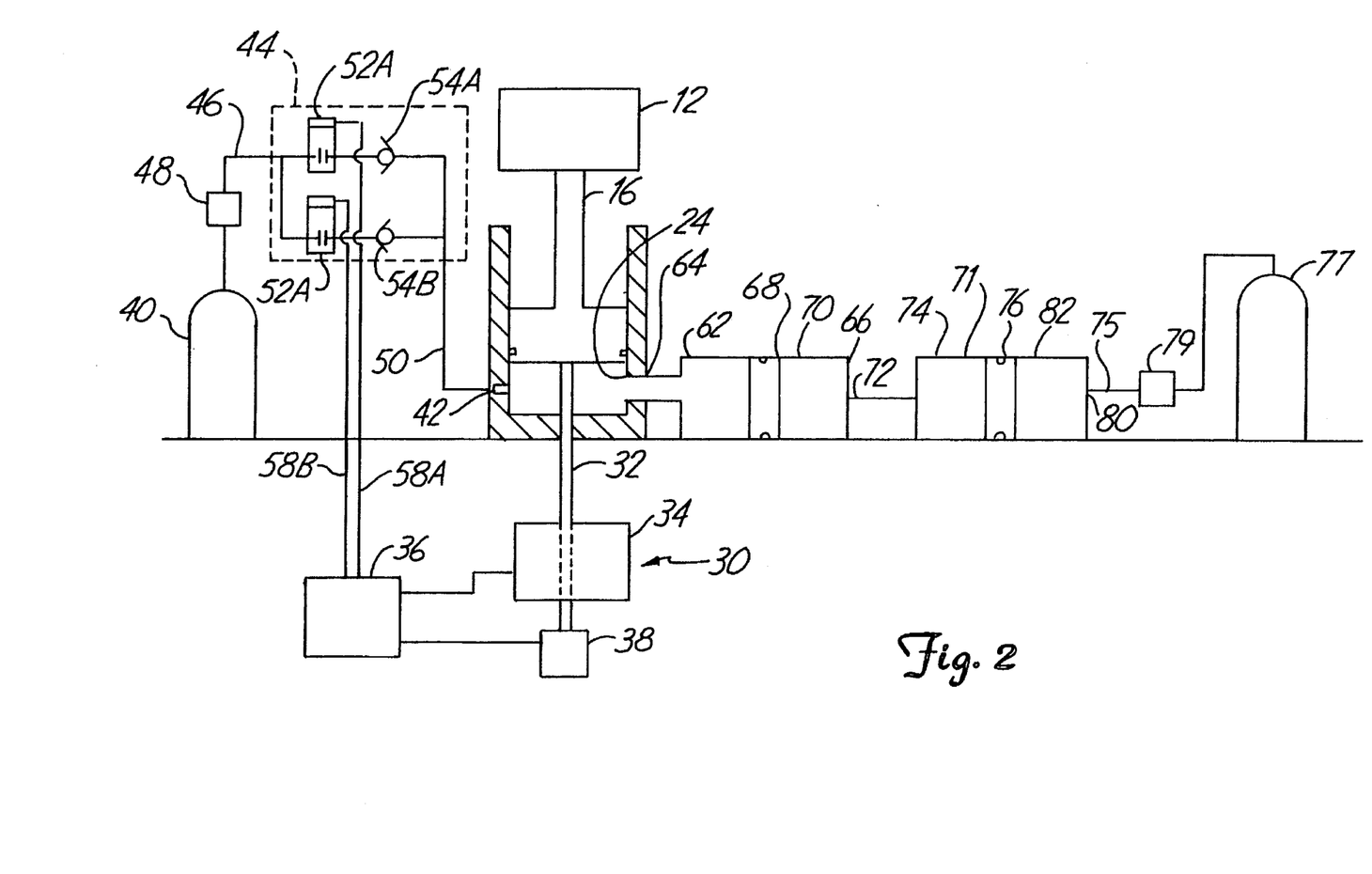
FIG. 2 schematically illustrates a second embodiment of a mass oscillator of the present invention.

To increase the frequency range without increasing overall displacement of the piston 14 within the bore 18, a second chamber 62 of adjustable volume is connected to the chamber 24 through a port 64 as illustrated in FIG. 2. The second chamber 62 is formed in a housing 66 having a displaceable isolator piston 68. A third chamber 70 formed on an opposite side of the piston 68 is connected through a long thin tube 72 to chamber 71 in a housing 74 also having a displaceable sliding piston 76. A chamber 82 is formed on an opposite side of the piston 76. A line 75 connects the chamber 82 through a port 80 opening to a gas source 77. A pressure regulator 79 connected in the line 75 is used to adjust the pressure in the chamber 82 to approximately equal the average pressure in the chamber 24.

The chamber 70, the chamber 71 and the tube 72 are filled with a fluid. When the piston 14 and mass 12 are oscillating at the natural frequency, the isolator piston 68 is held in a stationary position due to the inertia of fluid flow through the tube 72. The controller 36 receives the signal from the position transducer 38 to keep the piston 14 at a constant average displacement. The controller 36 inputs an average command to the motor 34 in addition to the oscillating command. The average command can be a DC offset or a pulse-width modulation signal. Accordingly, with operation of the tuning circuit 44 in the manner described above, the volume of the chamber 62 is changed due to movement of the isolator piston 68 in order to equalize the pressure between chambers 62 and 71. At this time, some fluid flow through the tube 72 is realized due to the average differential pressure across the length of the tube 72. Other devices to selectively move the isolator piston 68 can be used. For instance, an active valve, not shown, can be used to control flow into and out of the chamber 70.

Figure 3:
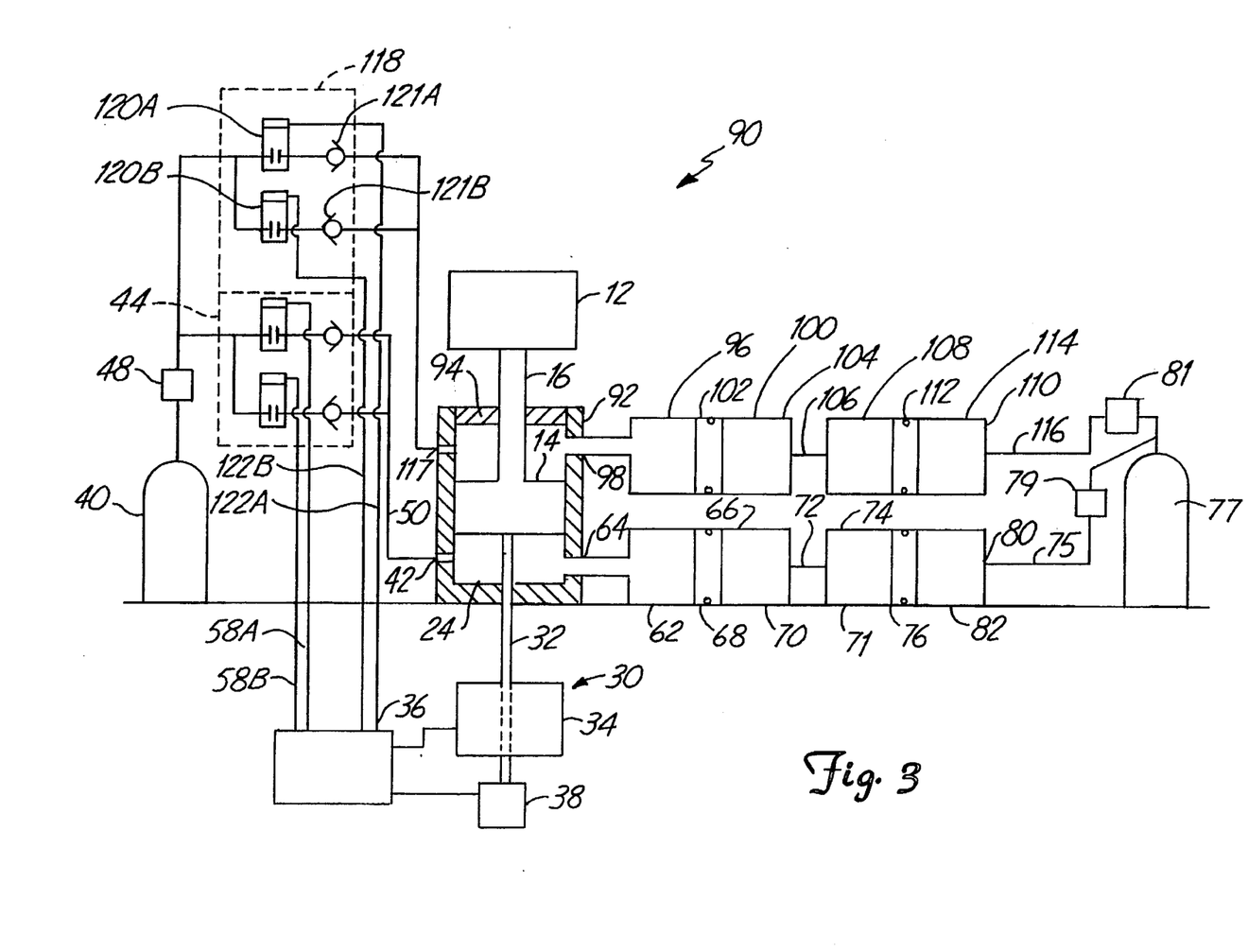
FIG. 3 schematically illustrates a third embodiment of a mass oscillator of the present invention.

FIG. 3 illustrates an apparatus 90 that allows greater acceleration of the mass 12. Components of the apparatus 90 that operate in the manner described above with respect to the two previous embodiments have been similarly numbered. Piston 14 is displaced in a cylinder 92 having two sealed chambers 24 and 94 formed on opposite sides. The chamber 94 opens to a chamber 96 through a port opening 98. The chamber 96 is formed in a housing 100 having a displaceable isolator piston 102 similar to isolator piston 68. A chamber 104 having a fluid communicates through a tube 106 to a chamber 108 formed in a housing 110. The housing 110 has a displaceable isolator piston 112. A chamber 114 connects through a line 116 and a pressure regulator 81 to the gas source 77.

A second tuning circuit 118 similar to the tuning circuit 44 is connected to a port 117 opening to the chamber 94. The tuning circuit 118 includes solenoid valves 120A and 120B and check valves 121A and 121B connected in series similar to the tuning circuit 44. The solenoid valves 120A and 120B are controlled by the controller 36 through signal lines 122A and 122B, respectively. The tuning circuit 118 is controlled by the controller 36 in a manner similar to the tuning circuit 44 in order to adjust the average volume of gas in the chamber 96 by equalizing the pressure between chambers 96 and 104.

Generally, the mass 12 is connected to two parallel counter-acting springs formed by the gas average volume in chambers 24 and 62, and the gas average volume in chambers 94 and 96. Connected in this manner, the natural frequency of the oscillating mass 12 is function to the mass of piston 14 and the mass 12 and elements connected thereto along with the average pressures exerted upon the piston 14 by the gas in chambers 94,96, and 24,62, and the average compressible fluid volume in the chambers 94,96, and 24,62. Pressure regulators 79 and 81 are used to adjust the pressures, while the tuning circuits 44 and 118 are used to adjust the volume.

Figure 4:
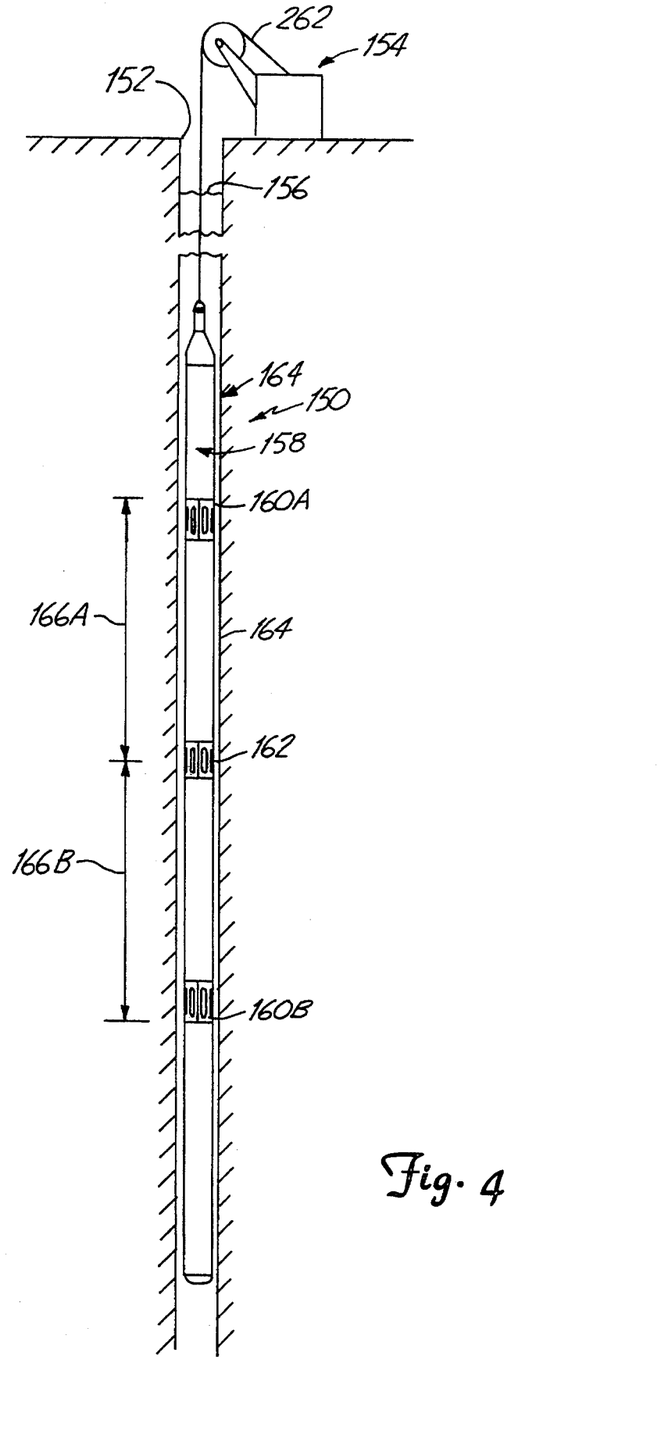
FIG. 4 is an elevational view of an acoustical source of the present invention positioned in a borehole.

Referring now to FIG. 4, an apparatus 150 capable of developing acoustical waves for mapping underground structures is illustrated. The apparatus 150 includes an adjustable average volume gas spring operating in a manner similar to the embodiments described above. The apparatus 150 is lowered into a borehole 152 by a suitable apparatus 154. The borehole 152 is filled with a liquid such as water or mud indicated at 156. The apparatus 150 includes an outer cylindrical casing 158 having a diameter less than the diameter of the borehole 152 so that the liquid 156 surrounds the apparatus 150 to form an annulus of liquid 164 between the casing 158 and the inner wall of the borehole 152.

Generally, the apparatus 150 includes a plurality of port openings 160A and a plurality of port openings 160B located generally at opposite ends of the apparatus 150. A third plurality of port openings 162 is located between the remote port openings 160A and 160B, preferably at equal distances therefrom. As stated above, the annulus of liquid 164 surrounds the casing 158 within the borehole 152. In particular, the mass of fluid between the plurality of port openings 160A and 160B is divided into two cylindrical annuli of fluid illustrated generally by double arrows 166A and 166B. Operation of the acoustical source 150 described in detail below causes the fluid in the annuli 166A and 166B to oscillate between the center port openings 162 and each of the end port openings 160A and 160B. Each of the port openings 160A and 160B are operably connected to accumulators 170A and 170B, respectively, illustrated in FIG. 6A and 6C, respectively. Oscillating movement of the cylindrical annuli fluid masses 166A and 166B produces cyclical pressure variations in the fluid surrounding the port openings 162. The pressure at the ends of the cylindrical annuli 166A and 166B near the port openings 160A and 160B remains substantially constant due to the presence of the accumulators 170A and 170B.

Figure 5:
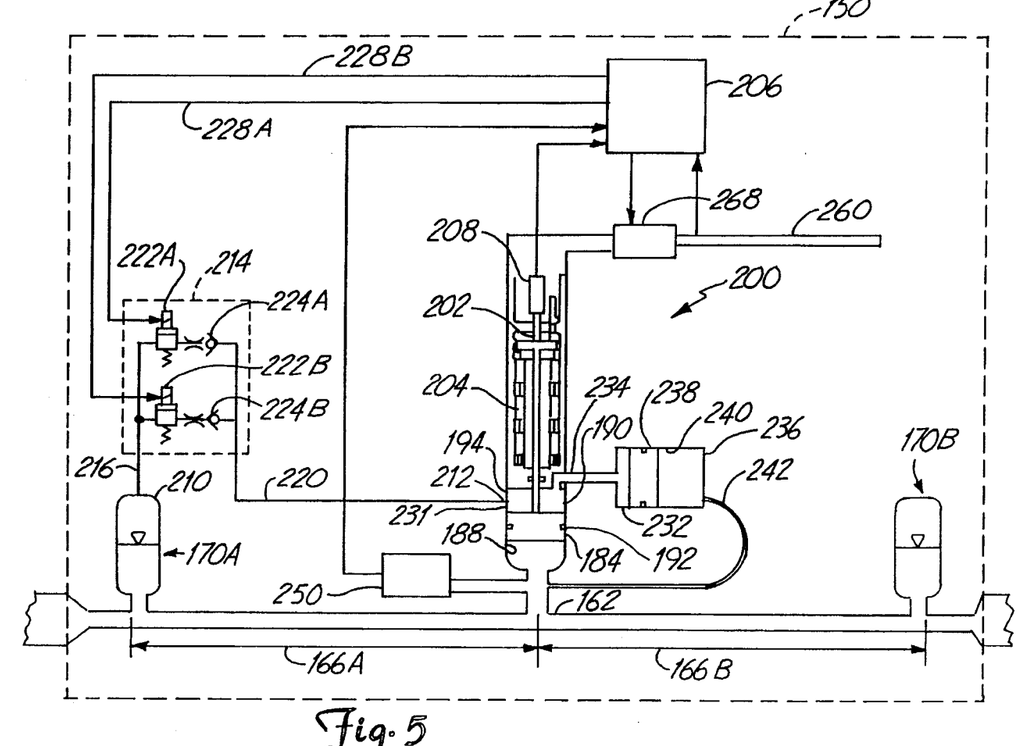
FIG. 5 is a block diagram of the acoustic source.

Referring also to FIG. 5, the apparatus 150 includes a piston 184 fluidly connected to the masses 166A and 166B through the port openings 162. The piston 184 slides in a bore 188 of a cylinder 190. A suitable seal 192 mounted on the perimeter of the piston 184 forms a seal against the bore 188 to form a chamber 194. As illustrated, the chamber 194 includes a portion 231 formed in the cylinder 190, a chamber 232 formed in a housing 236 and a connecting tube 234.

The chamber 194 when filled with a compressible fluid acts as a spring. A drive actuator 200 initiates displacement of the piston 184 either downwardly to increase the average volume of chamber 194 or upwardly to compress the piston 184 against a column of compressible fluid in the chamber 194. When released by the actuator 200, the piston 184 returns to its initial position and if periodically excited by the drive actuator 200 in phase with the velocity of the moving mass annuli 166A and 166B, will cause oscillating displacement of the mass annuli 166A and 166B at the natural frequency determined by the spring constant of the column of compressible fluid in the chamber 194 and the mass combination of the mass annuli 166A and 166B. Of course, the pressure in the chamber 194 is a function of the ambient pressure in the borehole 152 as determined by the position of the apparatus 150. In other words, the pressure in the chamber 194 is a function of the head of the fluid 156 above the port openings 162 and any external pressure applied to the well.

As illustrated, the drive actuator 200 is connected to the piston 184 on a side opposite the port openings 162 with a connecting rod 202 that extends through a sealed aperture in the cylinder 190. The drive actuator 200 includes a suitable drive motor 204, such as a linear motor which is illustrated. A controller 206 controls the drive motor 204 and receives an input signal from a position transducer (LVDT) 208 that is operably connected to the connecting rod 202 to sense the position of the piston 184. The controller 206 includes suitable control circuitry to control the drive motor 204 so that the piston 184 and mass annuli 166A and 166B are oscillating at the natural frequency and maintained at the natural frequency based in part on positional information from the position transducer 208. By oscillating at the natural frequency, the drive actuator 200 need only be sized to overcome frictional losses in the oscillating system.

Reciprocal motion of the piston 184 in the chamber 194 defines an average volume of the chamber 194. By varying the average volume of the chamber 194 and thereby the average volume of gas in the chamber 194, the natural frequency of the oscillating mass annuli 166A and 166B is adjusted, which in turn adjusts the frequency of the acoustical wave generated by the apparatus 150. In the embodiment illustrated, the compressible fluid is a suitable gas provided from a gas source 210 that is charged in the accumulator 170A. Based on control signals provided from the controller 206, a tuning circuit 214 adjusts the amount of gas in the chamber 194. An input line 216 connects the gas source 210 to the tuning circuit 214, while an output line 220 connects the tuning circuit 214 to the chamber 194 through a port opening 212.

The tuning circuit 214 includes a solenoid valve 222A connected in series with a check valve 224A, the combination of which are connected in parallel with a second solenoid valve 222B and a second check valve 224B. Each of the solenoid valves 222A and 222B are connected to the controller 206 through control lines 228A and 228B, respectively.

Operation of the solenoid valves 222A and 222B allows the average volume of gas connected to the chamber 194 to be adjusted. As stated above, a column of gas is present in the chamber 194. If the piston 184 is stationary, the column of gas is at a pressure determined by essentially the weight of the fluid 156 in the borehole 152 above the port openings 162. Since the column of gas in chamber 194 is alternately compressed and allowed to expand due to oscillating displacement of the piston 184, the pressure of the column of gas in the chamber 194 varies alternately above and below the stationary pressure, hereinafter the average pressure. The pressure of the gas in the input line 216 is adjusted to approximately equal the average pressure. In the embodiment illustrated, the accumulator 170A is charged at the surface to a pressure slightly below the well pressure at the highest level where the apparatus 150 is to be operated. In this manner, the pressure of the gas source 210 will be regulated to be substantially equal the average pressure in the chamber 194 as the apparatus 150 is lowered past the point where the pressure equals the pressure to which the accumulator 170A was charged.

To decrease the average volume of gas in the chamber 194 and thereby increase the natural frequency of the oscillating piston 184 and mass annuli 166A and 166B, the solenoid valve 222A is operated to open its corresponding valve, while the corresponding valve to the solenoid valve 222B is held closed. When the piston 184 has compressed the gas in the chamber 194 so that the pressure in the chamber is greater than the pressure in the line 216, a portion of the gas exits the chamber 194 through the port 212. Since the average pressure will be maintained in the chamber 24 as described below, the average volume in chamber 194 will decrease. Since the average volume of the chamber 194 has decreased, the spring constant of the column of gas in the chamber 194 has increased thereby changing the natural frequency of the system. The controller 206 controls the drive motor 204 to maintain oscillating displacement of the piston 184 and the mass annuli 166A and 166B at the new natural frequency. Likewise, to decrease the frequency of oscillation, the controller 206 operates the solenoid valve 222A to close its corresponding valve and operates the solenoid valve 222B to open its corresponding valve. When the piston 184 has moved sufficiently downwardly so that the pressure in the chamber 194 is less than the pressure in the input line 216, gas enters the chamber 194. Since the average pressure will again be maintained in the chamber 194, as described below, the average volume of the chamber 194 will increase. Since the average volume of the chamber 194 has increased, the spring constant of the column of gas in the chamber 194 has decreased thereby decreasing the natural frequency of the system. In the embodiment illustrated, no gas is added or lost by adjusting the natural frequency.

The tuning circuit 214 is a passive circuit in that the operation of the solenoid valves 222A and 222B does not have to be timed with pressure changes in the chamber 194. Rather, the check valves 224A and 224B insure proper gas flow through the port 212 when the natural frequency is increased or decreased, respectively. Preferably, the port 212 is small to allow only a small change in the average volume of the chamber 194 for each cycle of the piston 184. In this manner, the tuning circuit 214 sweeps through a range of frequencies. The sweep rate is determined by flow through the port 212. The solenoid valves 222A and 222B can be turned on and off to decrease the sweep rate.

Although a variable stroke actuator could be used to adjust the average volume of chamber 194, in the embodiment illustrated, the second chamber 232 is adjustable. The second chamber 232 is formed in the suitable housing 236 using a displaceable isolator piston 238. An additional chamber 240 formed on an opposite side of the piston 238 is connected through a tube 242 to the port opening 162.

In the embodiment illustrated, the chamber 240 and the tube 242 are filled with the well fluid 156. The tube 242 is relatively long and of small diameter so that inertia of fluid flow is high. When the piston 184 and mass annuli 166A and 166B are oscillating at the natural frequency, the isolator piston 238 is held in the stationary position due to the inertia of fluid flow through the tube 242. The isolator piston 238 is displaced slowly as fluid steadily flows through the tube 242 in response to a mean pressure difference across the length of the tube 242. Specifically, the controller 206 inputs an average command to the motor 204 in addition to the oscillating command. The average command can be a DC offset or a pulse-width modulation signal. Accordingly, with operation of the tuning circuit 214 in the manner described above, the volume of the chamber 232 is changed due to movement of the isolator piston 238 in order to equalize the pressure between the chambers 232 and the port openings 162. At this time, some fluid flow through the tube 242 is realized due to the average differential pressure across the length of the tube 242.

A pressure transducer 250 provides a signal to the controller 206 proportional to the pressure at the plurality of port openings 262. The pressure amplitude of the resonating system is controlled by varying the drive force from the drive motor 204. The pressure transducer 250 also provides over-pressure protection.

Power is supplied to the apparatus 150 through a suitable conductor 260 provided on a cable 262 (FIG. 4) used to support the apparatus 150 in the borehole 152. The conductor 260 provides power to the controller 206 and a suitable power switching device or amplifier 268. The controller 206 operates the power switching device 268 that in turn controls electrical power to the drive motor 204.

Figure 6:
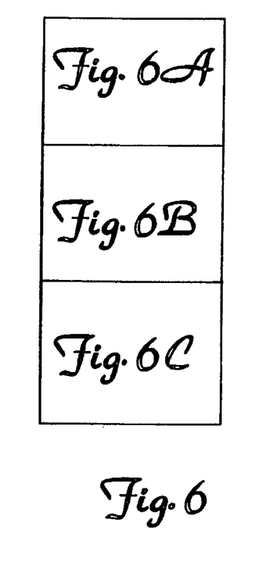
FIG. 6 is a block diagram illustrating arrangement of FIGS. 6A, 6B and 6C.
Figures 6A, 6B:
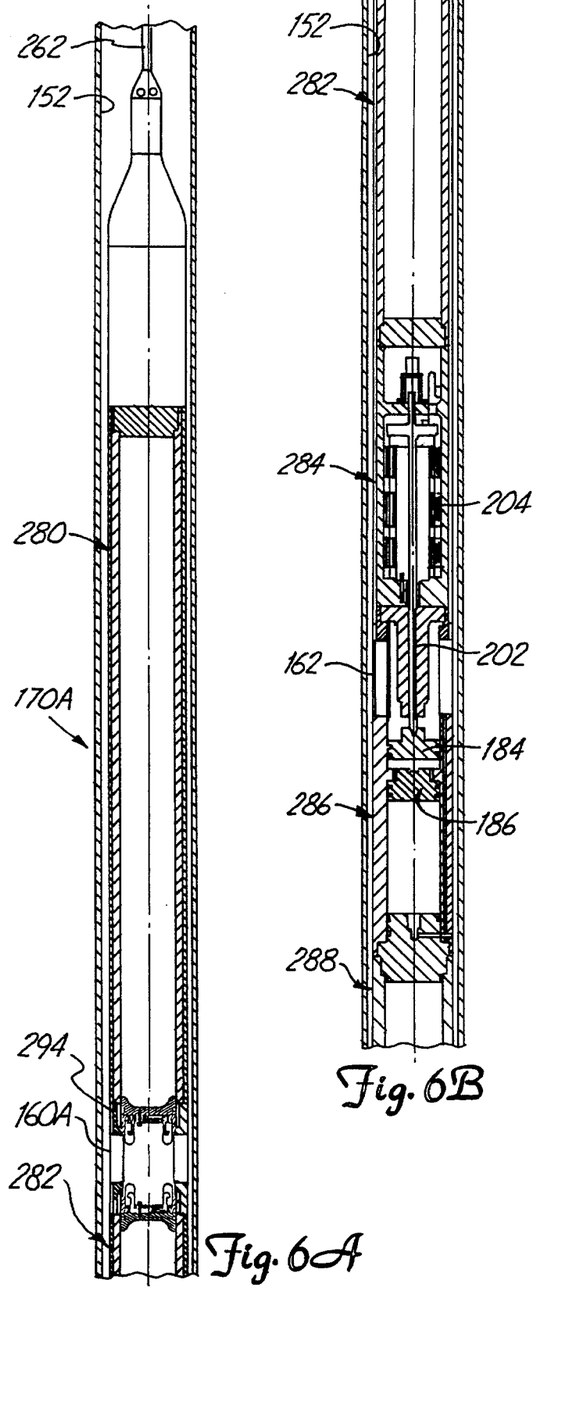
FIG. 6A, 6B and 6C are sectional views of the acoustic source.
Figure 6C:
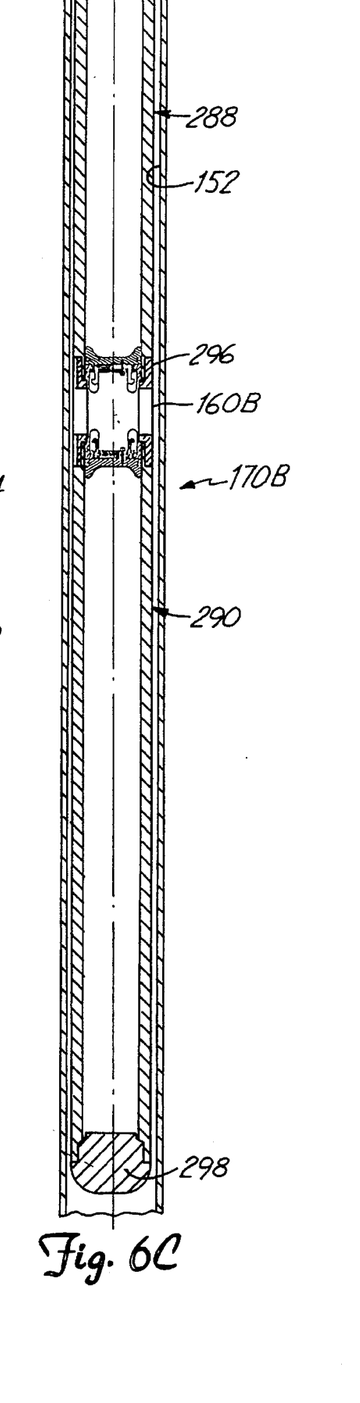

As illustrated in FIGS. 6A through 6C the outer casing 158 (FIG. 4) is formed from cylindrical housing segments 280, 282, 284, 286, 288 and 290. More specifically, the housing segment 280 is connected at a first end to the support cable 262 and at a second end to a hollow cylindrical member 294 having the plurality of port openings 160A formed therein. The cylindrical member 294 connects the housing segment 280 to the housing segment 282. The housing segment 282 is connected to the housing segment 284, which in turn is connected to the housing segment 286 having the plurality of port openings 162 therein. The housing segment 286 is joined to the housing segment 288 at an end opposite the port openings 162. A hollow cylindrical member 296 having the port openings 160B formed therein joins the housing segment 288 to the housing segment 290. An end cap 298 is joined to the remote end of the housing segment 290.

Figure 7:
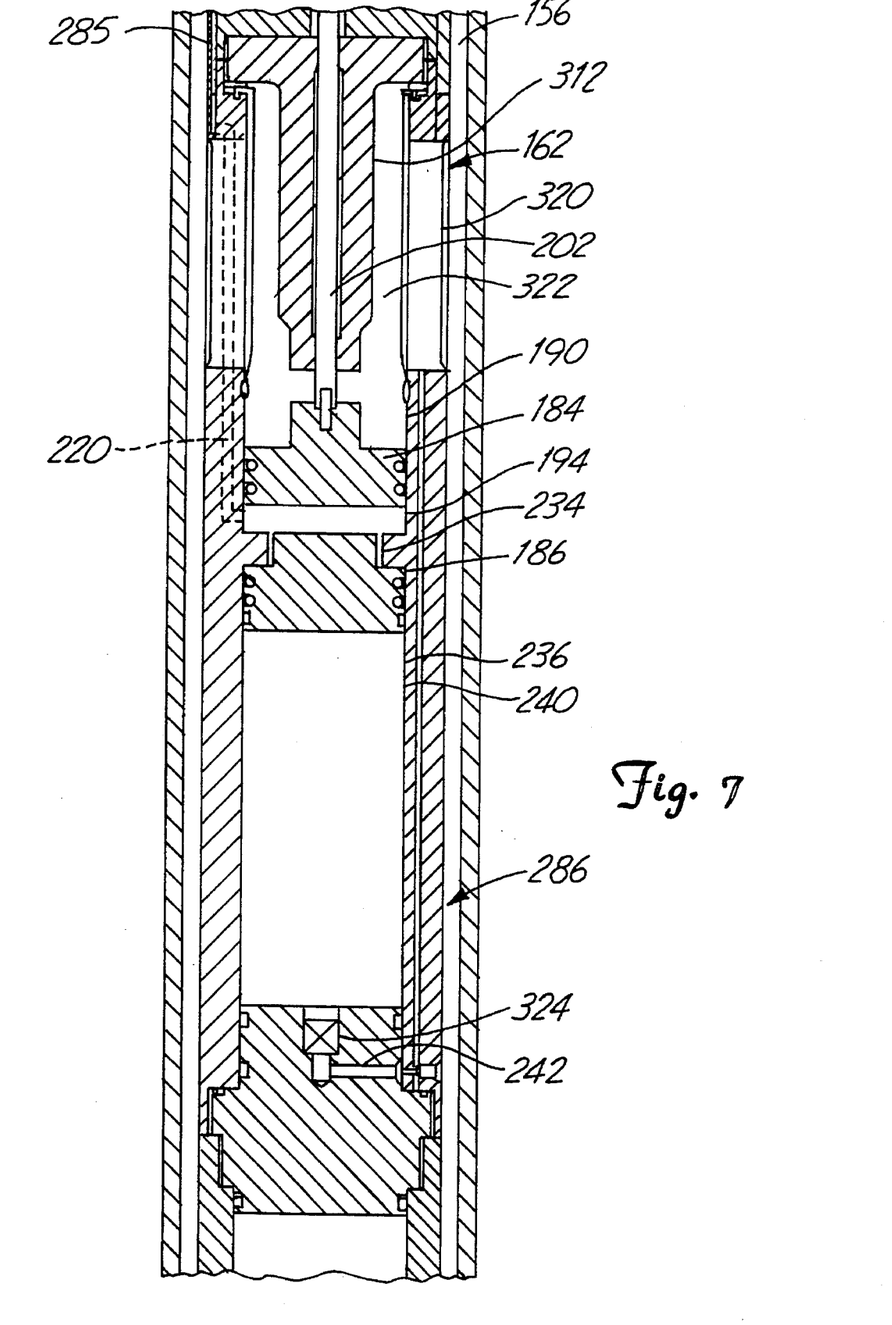
FIG. 7 is an enlarged sectional view of a portion of FIG. 6B.
Figure 8:
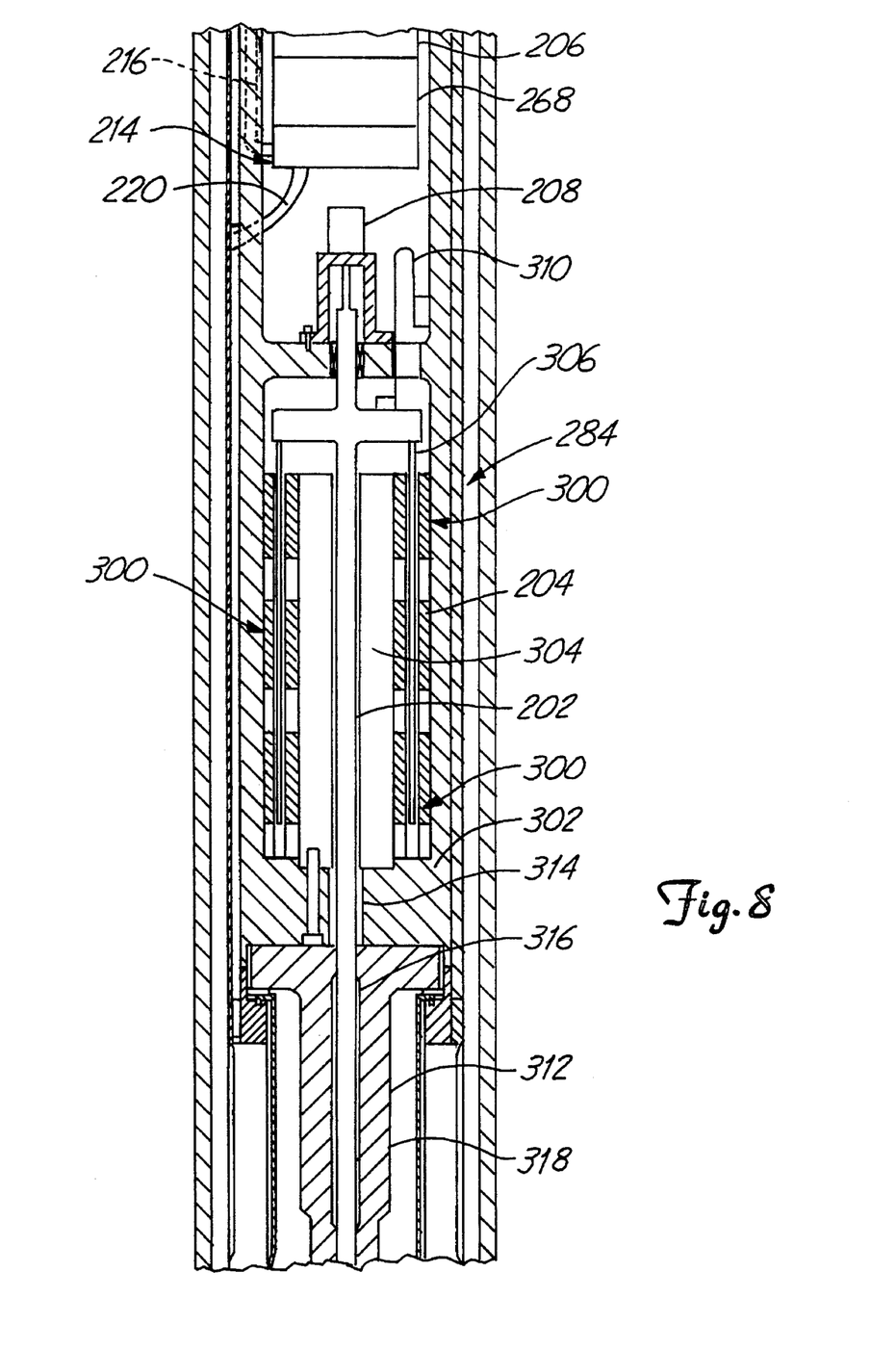
FIG. 8 is an enlarged sectional view of a portion of FIG. 6B.

FIGS. 7 and 8 illustrate components present in the housing segment 284 and the housing segment 286. Referring first to FIG. 8, the drive motor 204 is a linear motor formed within the housing segment 284. The linear motor 204 includes permanent magnets 300 attached to an outer support member 302 and an inner support member 304. A voice coil armature 306 is joined to the connecting rod 202. Other types of linear electric motors could be used.

A flexible conductor 310 provides electrical power to the voice coil armature 306 allowing movement thereof with the connecting rod 202. The position transducer 208 is operably connected to an end of the connecting rod 202 and provides a signal proportional to the position of the attached piston 184 (FIG. 7). The connecting rod 202 extends through an aperture 314 provided in the support member 302 and an aperture 316 in a second support member 318 that is attached to the support member 302.

Referring next to FIG. 7, a cylindrical diaphragm 320 isolates the piston 184 from the well fluid 156. An inner chamber 322 formed by the cylindrical diaphragm 320 is preferably filled with a non-compressible fluid. As illustrated, the cylinder 190 and the housing 236 are formed from a single unitary cylindrical body. Operation of elements illustrated in FIGS. 7 and 8 is as described above with reference to FIG. 5. Preferably, a filter 324 prevents contaminants from entering the chamber 240. Passageway 285 in FIGS. 7 and 8 is used for power and control wires as well as pressure lines 216 and 220.

Figure 9:
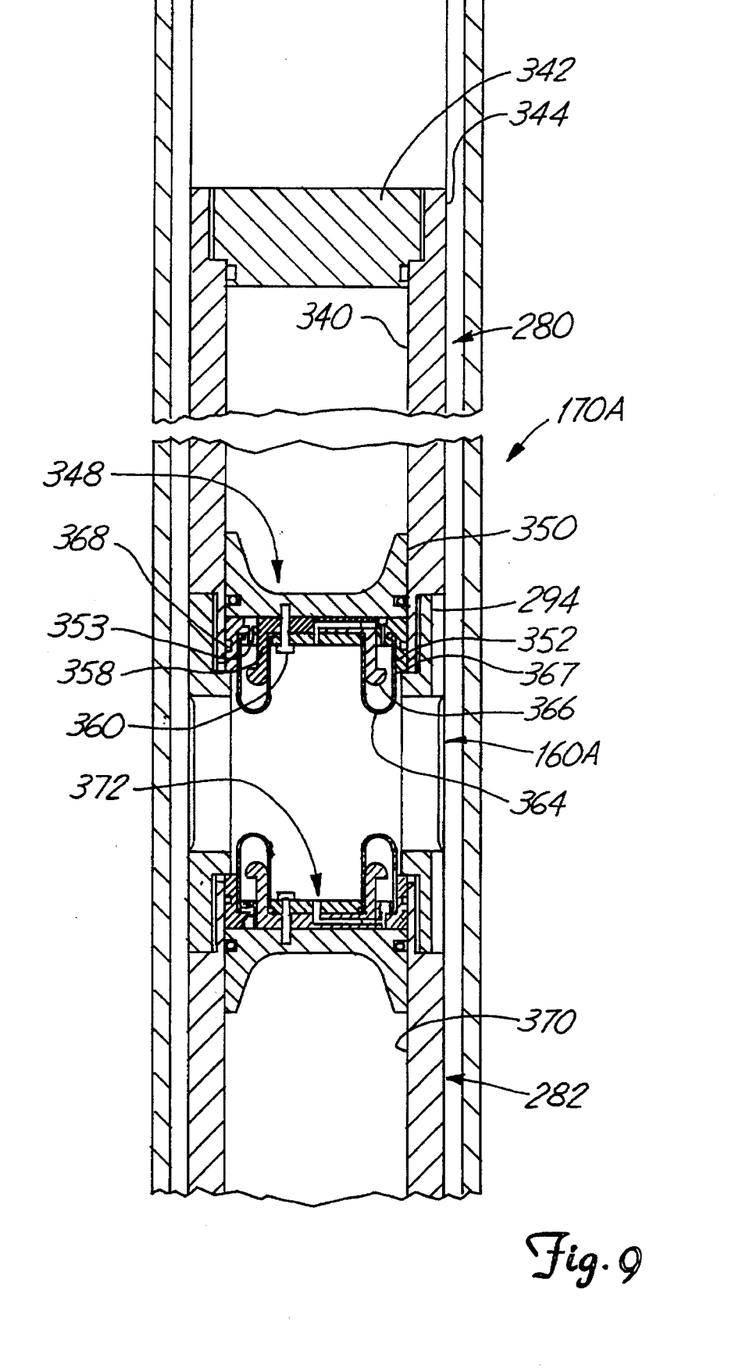
FIG. 9 is an enlarged sectional view of a portion of FIG. 6A.

The accumulator 170A is illustrated in detail in FIG. 9. The accumulator 170A includes a sealed chamber 340 formed the housing segment 280 having an end cap 342 secured to an end 344. A slidable piston assembly 348 slides on inner walls of the housing segment 280. The piston assembly 348 includes a first piston 350 and a second piston 352. A mechanical stop 358 is fastened to the piston 350 with a plurality of suitable fasteners, one of which is shown at 360. Fasteners 360 further secure a sealing plate 362 to the mechanical stop. The sealing plate 362 is used to seal a flexible bellow 364 to the first piston 350 and around extending flanges 366 of mechanical stops 358. An opposite end of the flexible bellow 364 is secured to the second piston 352 with a sealing plate 353. The second piston includes an excluder seal 368. A cylindrical chamber formed by the flexible bellow 364 is filled with oil. Travel of the piston assembly 348 is limited by an annular stop flange 367 on the hollow cylindrical member 294.

The purpose of the accumulators 170A and 170B is to alternately absorb and release the cyclical flow of the mass annuli 166A and 166B. The accumulators 170A and 170B need a gas volume large enough so that the pressure rise is minimal as the fluid 156 flows into each of the accumulators. Pressure variations at the accumulators cause energy losses to the borehole 152 beyond the apparatus 150. The port openings 160A and 160B are preferably slots suitably contoured to minimize flow loss therethrough.

During cyclical operation at the natural frequency, travel of the accumulator piston 350 is very small, for example less than one inch. While changing depth, the stroke of the piston assembly 348 is larger, for example 20 inches or more. The excluder seal 368, second piston 352 and flexible bellow 368 accommodates the long strokes while keeping the high speed piston 350 separated from the dirty well fluid 156.

Preferably, as illustrated, the accumulator 170 includes a second enclosed chamber 370 formed below the port openings 160A in the housing segment 282. A piston assembly 372 is constructed similar to the piston 348 described above and operates in the same manner. The addition of the enclosed chamber 370 allows greater volume for the accumulator 170A. It is to be understood that the accumulator 170B illustrated in FIG. 6C is constructed similarly.

Figure 10:
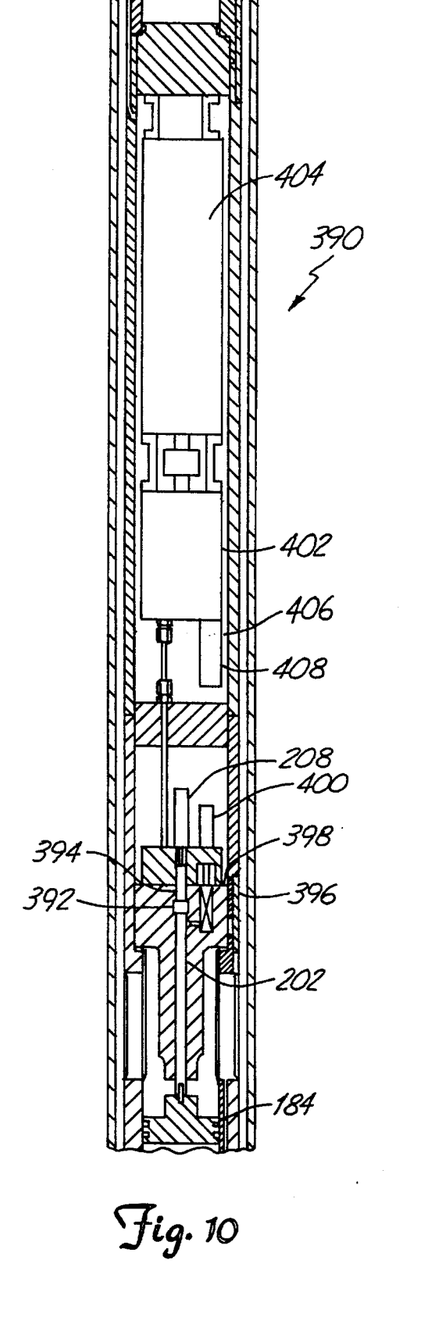
FIG. 10 is a sectional view of a second drive actuator.

A second drive actuator 390 is illustrated in FIG. 10. The drive actuator 390 is a hydraulic actuator having a suitable piston 392 formed on the connecting rod 202. The piston 392 slides within a cylindrical bore formed in a housing 396. A servo valve spool 398 controlled by the controller 206 alternately pressurizes opposite sides of piston 392 to oscillate it and thereby oscillate piston 184. A suitable position transducer 400 provides feedback signals to the controller 306 indicating the position of the valve spool 398. As with the embodiment described above, the position transducer 208 provides feedback signals indicating position of the piston 184.

Hydraulic power to displace the piston 392 is provided from a hydraulic power supply indicated at 402. An electric motor 404 is provided to drive the hydraulic power supply 402. An oil reserve is maintained in a chamber 406 for operation of the drive actuator 390. A filter 408 removes any contaminants in the oil reserve which could harm the hydraulic power supply 402.

Figure 11:
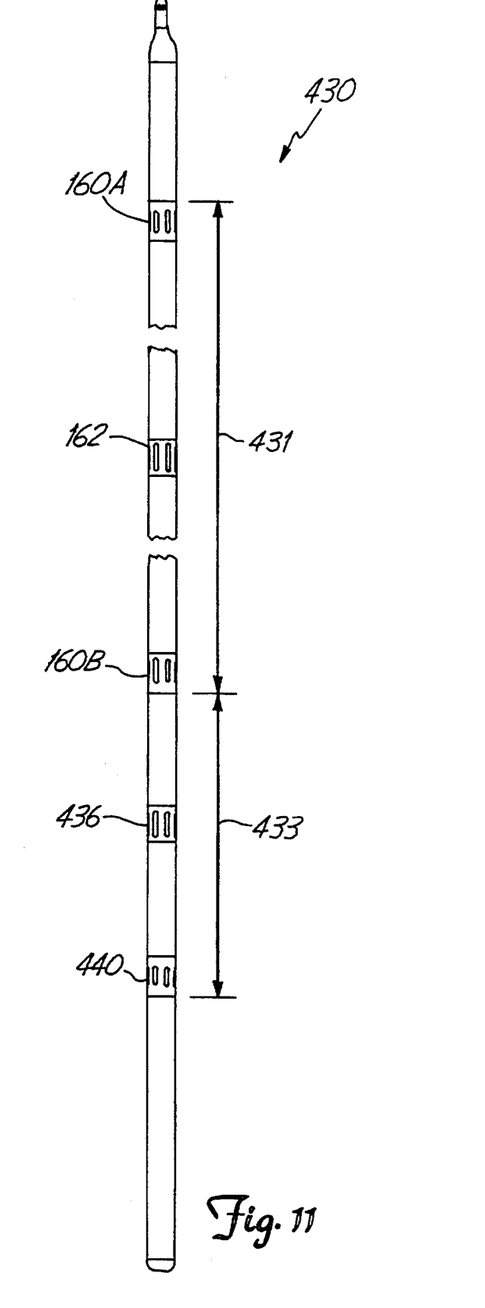
FIG. 11 is an elevational view of a second acoustical source with parts broken away.

As described above, the apparatus 150 allows acoustical waves to be generated over a selected range of frequencies. FIG. 11 illustrates an apparatus 430 having two acoustical wave generating sections indicated by double arrows 431 and 433. The section 431 includes all of the components described above with reference to the apparatus 150, while the second section 433 includes components necessary to generate natural frequencies over the second range of frequencies. Each of the components in the second section 433 would be similar to the components described with reference to apparatus 150, with modifications to generate, as illustrated, higher frequencies than those generated by the section 431. For example, a shorter annulus of fluid would have less mass than the annulus of fluid 164. The natural frequency would therefore be less for the same range of adjustment of the compressible fluid spring than that described with reference to apparatus 150. The second section 433 would include a plurality of port openings 436 through which two cylindrical mass annuli are displaced. The plurality of port openings 160B would be used during operation of the second section 433 while an additional plurality of port openings 440 and associated accumulator, would also be included. Additional sections could be added to produce natural frequencies over other selected ranges of frequencies as needed.

Although the present invention has been described with reference to preferred embodiments, workers skilled in the art will recognize that changes may be made in form and detail without departing from the spirit and scope of the invention.

What is claimed is:

1. An apparatus for oscillating a mass at a plurality of selected frequencies, the apparatus comprising:

a source of compressible fluid at a source pressure;

a cylinder having a bore filled with the compressible fluid and a port opening to the bore;

a piston slidable in the bore to define a chamber, the piston reciprocating in the bore to define an average volume of the chamber, the piston being operably connected to the mass to oscillate the mass at a selected frequency, and wherein a pressure in the chamber varies during reciprocating displacement of the piston above and below the source pressure; and a valve apparatus connecting the port to the source of compressible fluid, the valve apparatus including a first check valve for adjusting the average volume of the chamber to change the frequency of the oscillating mass by allowing compressible fluid to flow into the chamber from the source to increase the average volume when the pressure of the chamber is less than the source pressure, and a second check valve for adjusting the average volume of the chamber to change the frequency of the oscillating mass by allowing compressible fluid to flow from the chamber to the source to decrease the average volume when the pressure of the chamber is greater than the source pressure.

2. The apparatus of claim 1 wherein the valve apparatus includes a valve connected in series with one of the check valves between the source and the port; and wherein the apparatus further comprises controller means for controlling the valve to selectively open and close the valve.

3. The apparatus of claim 1 wherein the valve apparatus includes a first valve connected in series with the first-mentioned check valve between the source and the port, and a second valve connected in series with the second check valve between the source and the port; and wherein the apparatus further comprises controller means for controlling the first valve to selectively open and close the first valve, and for controlling the second valve to selectively open and close the second valve.

4. The apparatus of claim 3 and further comprising a drive actuator connected to the piston, the drive actuator receiving control signals from the controller means to maintain the oscillating mass at the selected frequency.

5. The apparatus of claim 4 wherein the drive actuator comprises a variable stroke actuator.

6. The apparatus of claim 4 wherein the drive actuator is a linear electric motor.

7. The apparatus of claim 4 wherein the drive actuator comprises a hydraulic actuator.

8. The apparatus of claim 4 wherein each frequency of the plurality of selected frequencies is a resonant frequency.

9. The apparatus of claim 1 wherein the mass is a volume of liquid.

10. The apparatus of claim 1 and further comprising a second cylinder having a second chamber and means for adjusting the volume of the second chamber, the second chamber being fluidly connected to the first-mentioned chamber.

11. The apparatus of claim 10 wherein the means for adjusting the volume of the second chamber comprises a displaceable piston located in the second cylinder and means for selectively maintaining the displaceable piston in a stationary position during oscillating displacement of the mass.

12. The apparatus of claim 11 wherein the displaceable piston isolates a third chamber from the second chamber, and wherein the means for selectively maintaining the displaceable piston in a stationary position comprises a fluid contained in the third chamber.

13. The apparatus of claim 12 wherein the second cylinder includes an aperture opening to the third chamber and the means for adjusting the volume of the second chamber includes means for restricting oscillating flow through the aperture.

14. An apparatus for generating an acoustical wave in a borehole containing a fluid mass at a plurality of selected frequencies, the apparatus comprising:

a source of compressible fluid at a source pressure;

a cylinder having a bore filled with the compressible fluid and a port opening to the bore;

a piston slidable in the bore to define a chamber, the piston reciprocating in the bore at a resonant frequency to define an average volume of the chamber, the piston being operably connected to the fluid mass to oscillate the fluid mass, and wherein a pressure in the chamber varies during reciprocating displacement of the piston above and below the source pressure; and a valve apparatus connecting the port to the source of compressible fluid, the valve apparatus including a first check valve for adjusting the average volume of the chamber to change the resonant frequency of the oscillating mass by allowing compressible fluid to flow into the chamber from the source to increase the average volume when the pressure of the chamber is less than the source pressure, and a second check valve for adjusting the average volume of the chamber to change the frequency of the oscillating mass by allowing compressible fluid to flow from the chamber to the source to decrease the average volume when the pressure of the chamber is greater than the source pressure.

15. The apparatus of claim 14 wherein the valve apparatus includes a valve connected in series with one of the check valves between the source and the port; and wherein the apparatus further comprises controller means for controlling the valve to selectively open and close the valve.

16. The apparatus of claim 14 wherein the valve apparatus includes a first valve connected in series with the check valve between the source and the port, and a second valve connected in series with the second check valve between the source and the port; and wherein the apparatus further comprises controller means for controlling the first valve to selectively open and close the first valve, and for controlling the second valve to selectively open and close the second valve.

17. The apparatus of claim 16 and further comprising a drive actuator connected to the piston, the drive actuator receiving control signals from the controller means to maintain the oscillating fluid mass at the resonant frequency.

18. The apparatus of claim 17 wherein the drive actuator comprises a variable stroke actuator.

19. The apparatus of claim 17 wherein the drive actuator is a linear electric motor.

20. The apparatus of claim 17 wherein the drive actuator comprises a hydraulic actuator.

21. The apparatus of claim 14 and further comprising a housing insertable in the borehole to a selected depth, the source of compressible fluid, the cylinder, the piston and the valve apparatus being disposed in the housing.

22. The apparatus of claim 21 wherein the housing includes a second chamber formed in a second cylinder and means for adjusting the volume of the second chamber, the second chamber being fluidly connected to the first-mentioned chamber.

23. The apparatus of claim 22 wherein the means for adjusting the volume of the second chamber comprises a displaceable piston located in the second cylinder and means for selectively maintaining the displaceable piston in a stationary position during oscillating displacement of the fluid mass.

24. The apparatus of claim 23 wherein the displaceable piston isolates a third chamber from the second chamber, and wherein the means for selectively maintaining the displaceable piston in a stationary position comprises a fluid contained in the third chamber.

25. The apparatus of claim 24 wherein the second cylinder includes an aperture opening to the third chamber and the means for adjusting the volume of the second chamber includes means for restricting oscillating flow through the aperture.

26. The apparatus of claim 25 wherein the means for restricting oscillating flow includes a tube.

27. The apparatus of claim 26 wherein tube opens to the borehole.

* * * * *